(12) United States Patent
Obuchi et al.

(10) Patent No.: US 8,396,156 B2
(45) Date of Patent: Mar. 12, 2013

(54) CONTROL CHANNEL INFORMATION TRANSMISSION METHOD, AND BASE STATION AND TERMINAL USING THE SAME METHOD

(75) Inventors: Kazuhisa Obuchi, Kawasaki (JP); Hideto Furukawa, Kawasaki (JP); Kazuo Kawabata, Kawasaki (JP); Yoshiharu Tajima, Kawasaki (JP); Yoshihiro Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/776,927

(22) Filed: May 10, 2010

(65) Prior Publication Data

US 2010/0220681 A1  Sep. 2, 2010

Related U.S. Application Data

(63) Continuation of application No. 12/073,086, filed on Feb. 29, 2008, which is a continuation of application No. PCT/JP2005/018117, filed on Sep. 30, 2005.

(51) Int. Cl.
*H04B 7/02* (2006.01)
*H04L 27/00* (2006.01)

(52) U.S. Cl. ........................................ 375/267; 375/295
(58) Field of Classification Search ............... 375/267, 375/260, 259; 455/132
See application file for complete search history.

(56) References Cited

U.S. PATENT DOCUMENTS

| | | | |
|---|---|---|---|
| 5,557,632 A * | 9/1996 | Kaku et al. | 375/340 |
| 7,298,703 B1 | 11/2007 | Rose | |
| 2003/0043749 A1 * | 3/2003 | Tanaka et al. | 370/241 |
| 2004/0235501 A1 | 11/2004 | Sato | |
| 2005/0120097 A1 | 6/2005 | Walton et al. | |
| 2005/0128976 A1 | 6/2005 | Uehara et al. | |
| 2005/0197065 A1 | 9/2005 | Tamaki et al. | |
| 2006/0128309 A1 * | 6/2006 | Dateki et al. | 455/41.3 |
| 2006/0133463 A1 * | 6/2006 | Pietila et al. | 375/150 |
| 2007/0248041 A1 | 10/2007 | Seki | |

FOREIGN PATENT DOCUMENTS

| | | |
|---|---|---|
| CN | 1515127 | 7/2004 |
| CN | 1531261 | 9/2004 |
| CN | 1665166 | 9/2008 |
| JP | 2005-175542 | 6/2005 |
| JP | 2005-252745 | 9/2005 |
| JP | 2005-260992 | 9/2005 |
| WO | 03085876 | 10/2003 |
| WO | 2004/012370 | 2/2004 |
| WO | 2006/070466 | 7/2006 |

OTHER PUBLICATIONS

Yoshihisa Kishiyama et al; "Experiments on Throughput Performance Above 100-Mbps in Forward Link for VSF-OFCDM Broadband Wireless Access" dated Oct. 6, 2003.*

Allert van Zelst et al; "Implementation of a MIMO OFDM-Based Wireless LAN System" IEEE Transactions on Signal Processing vol. 52. No. 2, Feb. 1, 2004.*

(Continued)

*Primary Examiner* — David C. Payne
*Assistant Examiner* — Brian J Stevens
(74) *Attorney, Agent, or Firm* — Myers Wolin, LLC

(57) ABSTRACT

A method for transmitting a control channel information to perform an adaptive coding and modulation comprising performing error correction coding at a predetermined coding rate for the control channel information; modulating according to a predetermined modulation scheme and transmitting the error correction coded control channel information; and further, prior to the modulation, performing code decimation or code repetition of the error correction coded signal, according to whether or not Multi Input Multi Output is applied.

9 Claims, 13 Drawing Sheets

OTHER PUBLICATIONS

3GPP TS 25.212 V5.9.0 (Jun. 2004); 3rd Generation Partnership Project; Technical Specification Group Radio Access Network; Multiplexing and channel coding (FDD); (Release 5); Jun. 2004.

Korean Intellectual Property Office "Office Action" for corresponding Korean Patent Application No. 10-2008-7007190, mailed Sep. 30, 2009; English translation attached.

The State Intellectual Property Office of China "First Notification Action" for corresponding Chinese Patent Application No. 200580051722.9, issued Mar. 15, 2010. English translation attached.

The State Intellectual Property Office of China "First Notification of Office Action" issued for corresponding Chinese Patent Application No. 201010507997.1, dated Jun. 22, 2011. English translation attached.

Extended European Search Report, Supplementary European Search Report and Written Opinion, issued for corresponding European Patent Application No. 05788254.0, mailed May 27, 2011.

Extended European Search Report, European Search Report, Partial European Search Report/Declaration of no search and Written Opinion, issued for corresponding European Patent Application No. 10162974.9, mailed May 27, 2011.

Yoshihisa Kishiyama et al; "Experiments on Throughput Performance Above 100-Mbps in Forward Link for VSF-OFCDM Broadband Wireless Access" dated Oct. 6, 2003 [Ref.: EESR mailed May 27, 2011].

Allert van Zelst et al; "Implementation of a MIMO OFDM-Based Wireless LAN System" IEEE Transactions on Signal Processing vol. 52. No. 2, Feb. 1, 2004; [Ref.: EESR mailed May 27, 2011].

Van Zelst et al.; "Implementation of a MIMO OFDM-Based Wireless LAN System"; IEEE Transactions on signal processing; vol. 32, No. 2; Feb. 2004.

Official Office Action issued by the United States Patent and Trademark Office for corresponding U.S. Appl. No. 12/073,086 with electronic delivery notification date of May 4, 2012.

Notification of Reason for Rejection issued by the Japanese Patent Office for corresponding Application No. 2010-094047 issued Feb. 16, 2012 with English translation.

United States Patent and Trademark Office Non-Final Office Action issued for corresponding U.S. Appl. No. 12/073,086 dated Dec. 2, 2011.

The extended European search report includes the European search opinion issued for corresponding European Patent Application No. 12170253.4, dated Aug. 17, 2012.

The extended European search report includes the European search opinion issued for corresponding European Patent Application No. 12170239.3 dated Aug. 17, 2012.

The extended European search report includes the European search opinion issued for corresponding European Patent Application No. 12170243.5, dated Aug. 21, 2012.

Non-Final Office Action issued by the United States Patent and Trademark Office for corresponding U.S. Appl. No. 12/073,086, mailed Oct. 24, 2012.

* cited by examiner

FIG.4

Control channel format (With MIMO)

| Content | Number of bits | Variable range |
|---|---|---|
| Modulation scheme (antenna 1) | 2 | 4 types (QPSK, 8PSK, 16QAM, 64QAM) |
| Modulation scheme (antenna 2) | 2 | 4 types (QPSK, 8PSK, 16QAM, 64QAM) |
| Modulation scheme (antenna 3) | 2 | 4 types (QPSK, 8PSK, 16QAM, 64QAM) |
| Modulation scheme (antenna 4) | 2 | 4 types (QPSK, 8PSK, 16QAM, 64QAM) |
| Coding rate | 2 | 4 types (1/3, 1/2, 2/3, 3/4) |
| Spreading factor | 3 | 8 types (1, 2, 4, 8, 16, 32, 64, 128) |
| Code set | 128 | Maximum 128 codes |
| Total | 141 | |

Related Art

FIG.5

Control channel format (Without MIMO)

| Content | Number of bits | Variable range |
|---|---|---|
| Modulation scheme (common to antennas) | 1 | 2 types (QPSK, 16QAM) |
| Coding rate | 1 | 2 types (1/2, 3/4) |
| Spreading factor | 2 | 4 types (1, 4, 16, 64) |
| Code set | 64 | Maximum 64 codes |
| Total | 68 | |

FIG.13A

| Physical Channel | Parameter | Value<br>( ): MIMO is applied |
|---|---|---|
| P-CPICH | P-CPICH_Ec/Ior | -10dB |
| P-CCPCH | P-CCPCH_Ec/Ior | -12dB |
| SCH | SCH_Ec/Ior | -12dB |
| PICH | PICH_Ec/Ior | -15dB |
| DPCH | DPCH_Ec/Ior | -10dB |
| HS-SCCH_1 | HS-SCCH_Ec/Ior | -10dB ( -7dB) |
| HS-SCCH_2 | HS-SCCH_Ec/Ior | -10dB ( -7dB) |
| HS-SCCH_3 | HS-SCCH_Ec/Ior | -10dB ( -7dB) |
| HS-SCCH_4 | HS-SCCH_Ec/Ior | -10dB ( -7dB) |
| HS-PDSCH | HS-PDSCH_Ec/Ior | Test-specific |

FIG.13B

| Number of HS-SCCH | Traffic channel use rate without MIMO. | Traffic channel use rate with MIMO. (invention of prior application) | Traffic channel use rate with MIMO. (present invention) | Effects of the present invention |
|---|---|---|---|---|
| 1 | 70% | 60% | 70% | 1.17times |
| 2 | 60% | 40% | 60% | 1.5times |
| 3 | 50% | 20% | 50% | 2.5times |
| 4 | 40% | 0% | 40% | ∞times |

CONTROL CHANNEL INFORMATION TRANSMISSION METHOD, AND BASE STATION AND TERMINAL USING THE SAME METHOD

CROSS REFERENCE TO RELATED APPLICATIONS

This application is a continuation of U.S. application Ser. No. 12/073,086, filed on Feb. 29, 2008, now pending, which is a continuation of International Application No. PCT/JP2005/18117, filed on Sep. 30, 2005, the contents of each are herein wholly incorporated by reference.

TECHNICAL FIELD

The present invention relates to a control channel information transmission method, and a base station and a terminal using the same method, and more particularly, a control channel information transmission method for packet communication to adaptively control communication parameters using a control channel, and a base station and a terminal using the same method.

BACKGROUND ART

In a third-generation mobile communication system, an adaptive radio link, such as adaptive modulation/demodulation, HARQ (Hybrid Automatic Repeat Request) and scheduling, is employed to increase transmission efficiency of data packets.

Controlling such the adaptive radio link is carried out using an individual or common control channel, and link parameters being used in a data channel, which is transmitted substantially simultaneously with the control channel, are reported to each user terminal.

For example, in case of an Adaptive Modulation and Coding (AMC) scheme, the control channel transmits a modulation scheme and a coding rate of the data channel. In case of HARQ, the control channel transmits information such as the packet number of a packet to be transmitted on the data channel and the number of retransmission times. In case of scheduling, the control channel transmits information such as a user ID.

According to HSDPA (High Speed Downlink Packet Access) standardized in 3GPP (Third Generation Partnership Protocol) for third-generation mobile communication systems, transmission of control information as shown in TABLE 1 is carried out by use of the common control channel called HS-SCCH (Shared Control Channel for HS-DSCH), as described in Non-patent document 1.

TABLE 1

| | |
|---|---|
| Channelization-code-set information | 7 bits |
| Modulation scheme information | 1 bit |
| Transport-block size information | 6 bits |
| Hybrid-ARQ process information | 3 bits |
| Redundancy and constellation version | 3 bits |
| New data indicator | 1 bit |
| Ue identity | 16 bits |

Further, according to the above-mentioned HSDPA, when the AMC scheme is applied in FIG. 1, illustrating the relationship between the radio environment and the transmission speed, under good propagation condition in the varied radio environment I (exceeding a threshold level TH), high-speed data transmission is carried out by setting the modulation scheme to be 16 QAM (Quadrature Amplitude Modulation) with an increased coding rate.

On the other hand, under bad propagation condition (below the threshold level TH), data transmission is carried out at low speed by setting the modulation scheme to be QPSK (Quadrature Phase Shift keying) with a decreased coding rate.

As such, by changing the user transmission speed using the AMC scheme, it is carried out to maintain the quality constant. Namely, as shown in the above FIG. 1, according to HSDPA, the modulation scheme and the coding rate of HS-DSCH, user data, are made variable according to the propagation condition I. Further, HS-SCCH, which is control information related to the above user data, is also transmitted together with the user data (HS-DSCH).

However, at this time, in regard to HS-SCCH, the control information, as shown in FIG. 2, illustrating the relationship between the radio environment and the information amount, the coding rate of error correction coding for control information IV is constant, and accordingly, irrespective of good or bad radio environment I, an information amount to be transmitted becomes constant.

In the above case, when the radio environment I is in good condition, quality becomes excessive to the control information for transmission.

Further, in a next-generation mobile communication system, in order to realize high-speed data transmission, multi-carrier transmission and MIMO (Multi Input Multi Output) transmission using a plurality of antennas are employed. In this case, it is possible to further improve a transmission characteristic, using adaptive control of radio parameters on a subcarrier-by-subcarrier basis and on a basis of each transmission antenna.

When the above MIMO is employed, controlling whether MIMO is to be applied or not is carried out depending on good or bad propagation condition I, as shown in FIG. 3.

Namely, in FIG. 3 illustrating the relationship between the application or non-application of MIMO and the transmission speed, when MIMO is applied, transmission speed becomes high, whereas in the opposite case, the transmission speed becomes low.

Further, formerly, the applicants of the present invention have proposed an invention of selecting one control channel format from among a plurality of control channel formats, each having a different information amount, depending on a predetermined condition (whether MIMO is applied or not) in a transmission system employing MIMO, and transmitting the control channel using the above selected control channel format (International Application Publication WO/2006/070466: Hereafter simply referred to as prior application.)

The above prior application is targeted on the assumed cases that the number of control channel information bits differs depending on whether MIMO is applied or not. As a prerequisite, the number of information bits IV is increased when MIMO is applied (period III) for user data as shown in FIG. 4, while the number of information bits is decreased when MIMO is not applied for user data, as shown in FIG. 5.

Accordingly, as shown in FIG. 6 illustrating the relationship between the MIMO application and the control channel information amount, in the period III of the propagation environment I in which MIMO is applied, there is a problem that the number of variable parameters increases, and the number of information bits required for the control channel increases. Further, when the number of simultaneous multiplex users in a single frame increases, there is a problem that the control channel information also increases in proportion to the number of users.

[Non-patent document 1]
3GPP TS 25.212 V5.9.0 (2004-06)

DISCLOSURE OF THE INVENTION

Problems to be Solved by the Invention

Accordingly, the present invention is focused to solve the aforementioned problems in packet-type data transmission in which the AMC (Adaptive Modulation and Coding) scheme is applied, by making variable the coding rate in the error correction coding on HS-SCCH, the control channel information.

Means to Solve the Problems

As a first aspect of the present invention to solve the aforementioned problems, a control channel information transmission method includes: performing error correction coding for control channel information based on an Adaptive Modulation and Coding scheme; by using a predetermined modulation scheme, modulating and transmitting the error correction coded control channel information; and further, according to propagation condition, differentiating a coding rate in the error correction coding.

Further, as a second aspect of the present invention to solve the aforementioned problems, a control channel information transmission method includes: with a constant coding rate, performing error correction coding for control channel information based on an Adaptive Modulation and Coding scheme; by using a predetermined modulation scheme, modulating and transmitting the error correction coded control channel information; and further, prior to the modulation, performing code decimation or code repetition of the error correction coded signal, according to propagation condition.

Still further, as a third aspect of the present invention to solve the aforementioned problems, a control channel information transmission system based on an Adaptive Modulation and Coding scheme includes: on the base station side, an error correction coding unit performing error correction coding for control channel information; and a modulation unit modulating a coded output of the error correction coding unit with a predetermined modulation scheme. Further, it is configured that coding rates in the error correction coding unit are differentiated according to propagation conditions.

Further, in the aforementioned aspects, the coding rate of the control channel when Multi Input Multi Multi Output is applied is set larger than the coding rate when Multi Input Multi Output is not applied, so that the number of transmission code bits becomes constant irrespective of whether Multi Input Multi Output is applied or not.

In the aforementioned aspects, on the receiving side, error correction decoding for a commonly received signal is performed by respective error correction decoding units corresponding to coding rates differentiated according to the propagation condition, and further, likelihood in the error correction decoded signal is decided, and based on the likelihood decision result, an error correction decoded signal being decided to be valid is output.

The features of the present invention will become apparent by the embodiments of the invention described according to the accompanied drawings.

BRIEF DESCRIPTION OF THE DRAWINGS

FIG. 4 shows a diagram illustrating an example of a control channel format when MIMO is applied.

FIG. 5 shows a diagram illustrating an example of a control channel format when MIMO is not applied.

FIG. 13 shows a diagram illustrating the effect of the present invention, as compared with the case of employing the invention of the prior application.

BEST MODE FOR CARRYING OUT THE INVENTION

Figure 1:
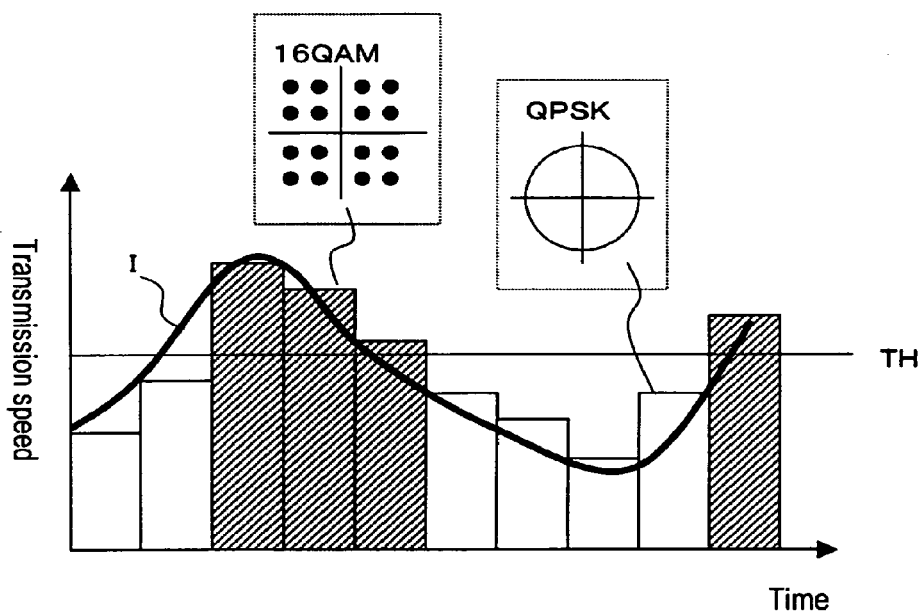
FIG. 1 shows a diagram illustrating relationship between a radio environment and a transmission speed in the AMC control of HS-DSCH of HSDPA, as the prior art.
Figure 2:
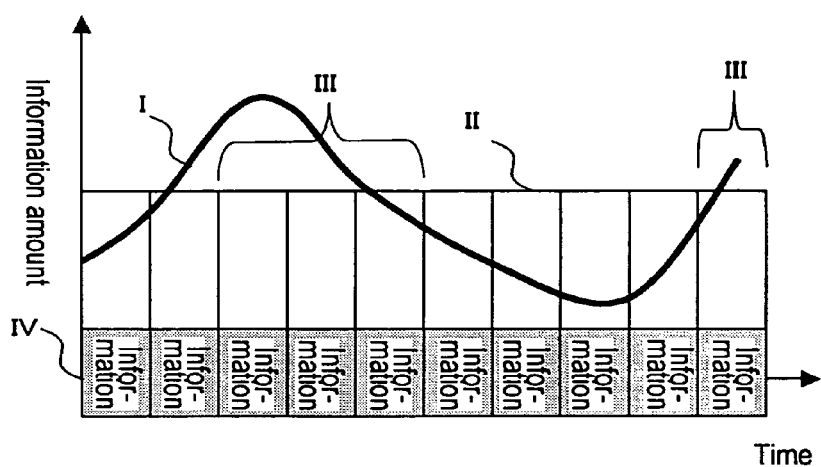
FIG. 2 shows a diagram illustrating relationship between a radio environment and an information amount in HS-SCCH of HSDPA, as the prior art.
Figure 3:
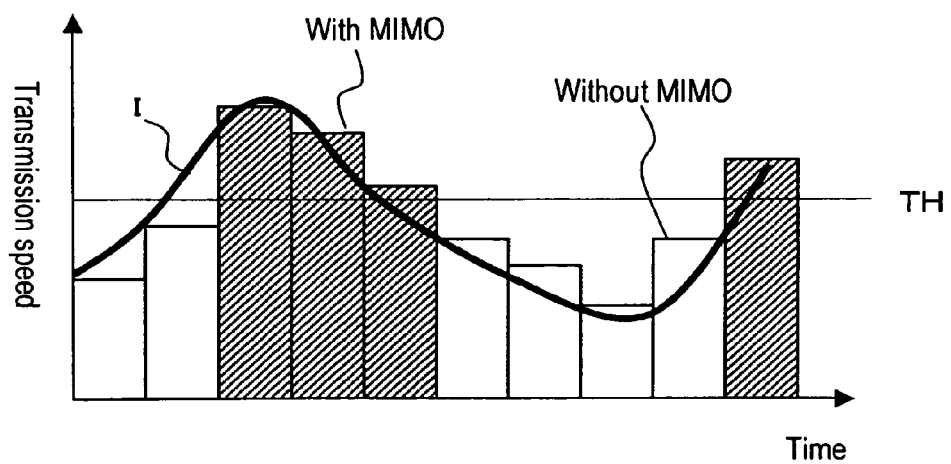
FIG. 3 shows a diagram illustrating relationship between a radio environment and a transmission speed in HS-DSCH in which MIMO is applied, in the prior application.

Hereinafter, the embodiments of the present invention are described referring to the drawings.

Figure 7:
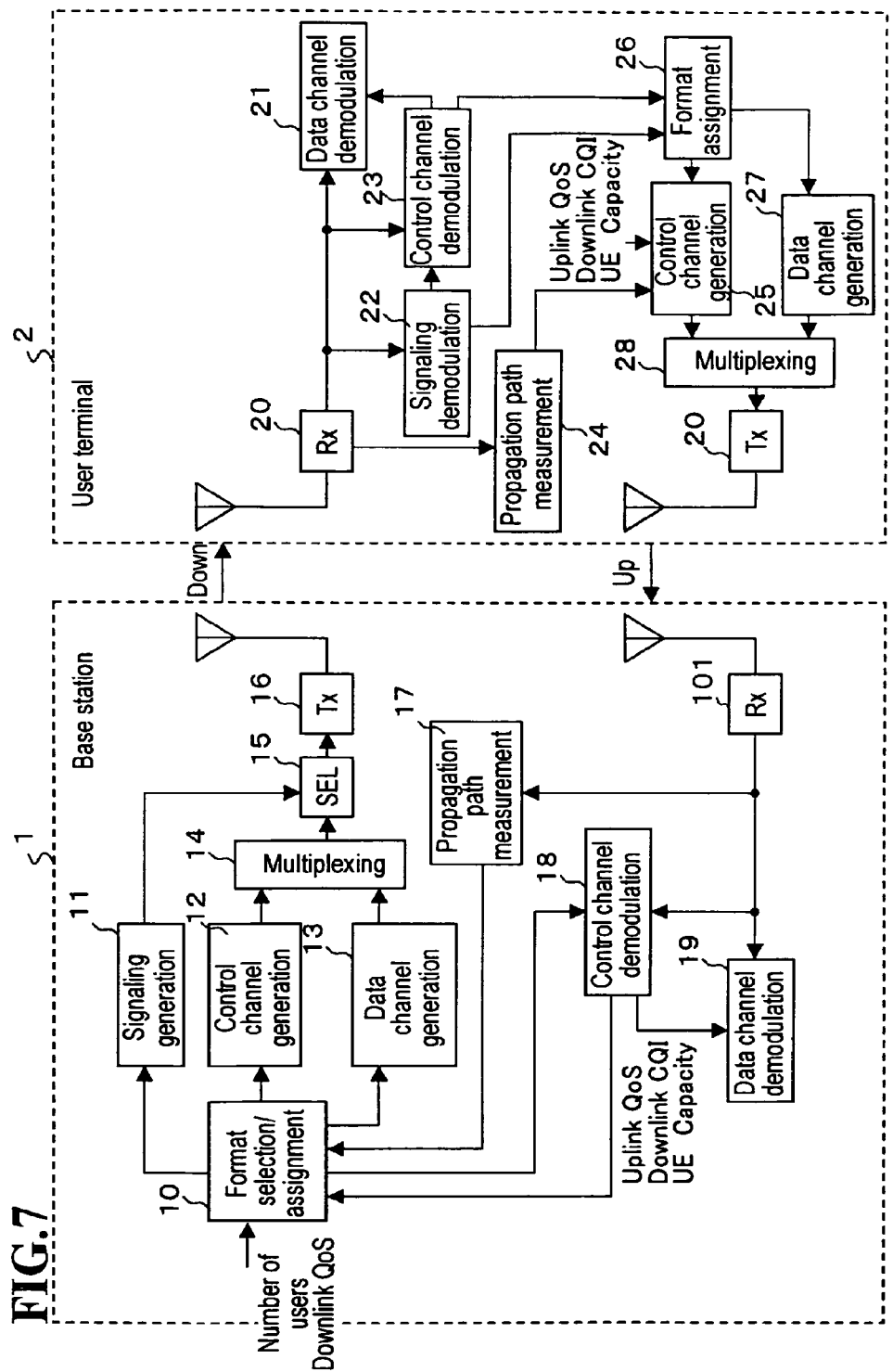
FIG. 7 shows a configuration block diagram of a transmission system including a base station 1 and a user terminal 2 in which the present invention is applied.

FIG. 7 shows a configuration block diagram of a transmission system including a base station 1 and a user terminal 2 in which the present invention is applied. In particular, the present invention has a feature in the configuration of the embodiment of a control channel generation section 12.

In regard to downlink control channel transmission from a base station 1 to a user terminal 2, the feature of the present invention is described using the embodiment of the prior application in which MIMO is applied. However, the application of the present invention is not limited to the transmission system configuration shown in FIG. 7.

A format selection/assignment section 10 in base station 1 selects a control channel format, based on information including the number of multiplex users, transmission/reception function of the user terminal, downlink QoS and downlink CQI (Channel Quality Indicator).

Here, examples of the control channel formats to be selected are as shown earlier in FIG. 4(TABLE 2) and FIG. 5(TABLE 3).

A control format A shown in FIG. 4 includes modulation scheme (antenna 1)-modulation scheme (antenna 4), coding rate, spreading factor and code set, as adaptive control parameters. For example, in modulation scheme (antenna 1)-modulation scheme (antenna 4), four (4) modulation scheme types (QPSK, 8 PSK, 16 QAM, 64 QAM) are set as a variable range. In the above control channel format A shown in TABLE 2, the types of adaptive parameters and the variable range are wide, and for example, the modulation scheme can be varied on an antenna-by-antenna basis at the time of MIMO transmission.

Meanwhile, a control format B shown in FIG. 5 includes modulation scheme (common to antennas), coding rate, spreading factor and code set, as adaptive control parameters. For example, in the modulation scheme (common), two modulation scheme types (QPSK, 16 QAM) are set as a variable range. In the above control channel format B shown in TABLE 3, as compared with the control channel format A, the types and the variable range of the adaptive control parameters are limited, and the number of bits is approximately ½ of the control channel format A.

Referring back to FIG. 7, information representing the assignment of the control channel format selected in format selection/assignment section 10 is reported from a signaling generation section 11 to user terminal 2, via a selector 15 and a transmitter 16, as signaling information. Also, the format assignment information is reported to control channel generation section 12 and a data channel generation section 13.

Control channel generation section 12 is a featured portion of the present invention, and has different configurations and functions corresponding to the embodiments described later, and however, as a basic configuration, the configuration includes an error correction coding unit and a modulation unit.

The control channel and the data channel, generated in control channel generation section 12 and data channel generation section 13, are multiplexed in a multiplexing section 14 based on the format assignment information, and thereafter, transmitted via a downlink to user terminal 2, through transmitter 16.

A signaling demodulation section 22 in user terminal 2 demodulates the signaling information (format assignment information) reported from base station 1 through a receiver 20, and reports a downlink control channel format to a control channel demodulation section 23. Control channel demodulation section 23 demodulates the control channel based on the downlink control channel format reported from signaling demodulation section 22. Control channel demodulation section 23 reports downlink adaptive control parameters demodulated from the control channel, to a data channel demodulation section 21.

Data channel demodulation section 21 performs demodulation of the data channel, using the adaptive control parameters reported from control channel demodulation section 23.

The downlink CQI for use in selecting the downlink control channel format is measured by a propagation path measurement section 24 in user terminal 2. The downlink CQI is transmitted to base station 1, through the uplink control channel from user terminal 2 to base station 1, together with the uplink QoS and the transmission/reception function of user terminal 2.

Next, uplink control channel transmission from user terminal 2 to base station 1 will be described.

Similar to the downlink control format, an uplink control channel format is selected in format selection/assignment section 10 of base station 1. To select the uplink control channel format, information sets including the number of multiplex users, the transmission/reception function of the user terminal, uplink QoS, uplink CQI (Channel Quality Indication), etc. are used.

The selected uplink control format is reported from signaling generation section 11 to user terminal 2, via selector 15 and transmitter 16, as signaling information. Signaling demodulation section 22 demodulates the signaling information reported from base station 1, decides the assignment (multiplexing method) of the control channel and the data channel on the uplink, and reports the above format assignment information to a control channel generation section 25 and a data channel generation section 27.

In base station 1, the uplink control channel format selected by format selection/assignment section 10 is reported to a control channel demodulation section 18 for the uplink.

Control channel demodulation section 18 demodulates the control channel, based on the uplink control channel format reported from format selection/assignment section 10. Control channel demodulation section 18 reports the demodulated uplink adaptive control parameter to a data channel demodulation section 19.

Data channel demodulation section 19 performs demodulation processing of the data channel, using the adaptive control parameter reported from control channel demodulation section 18. The uplink CQI for use in selecting the uplink control channel format is measured by a propagation path measurement section 17 in base station 1.

Additionally, the measured uplink CQI is report from propagation path measurement section 17 to format selection/assignment section 10. Also, the uplink QoS, the downlink CQI and the transmission/reception function of user terminal 1, transmitted to base station 1 through the uplink control channel from user terminal 2 to base station 1, are transmitted to format selection/assignment section 10.

Next, in FIG. 7, an exemplary configuration of control channel generation section 12 featuring the present invention will be described. Here, in the prior application, there has been assumed a case of applying MIMO, in which the number of control channel information bits differs depending on whether MIMO is applied or not, as shown in FIG. 4 and FIG. 5.

Namely, from among a plurality of control channel formats, one control channel format is selected and used so that the number of control channel information sets is large when MIMO is applied for user data (refer to FIG. 4), while the number of control channel information sets becomes small when MIMO is not applied for user data (FIG. 5).

Figure 8:
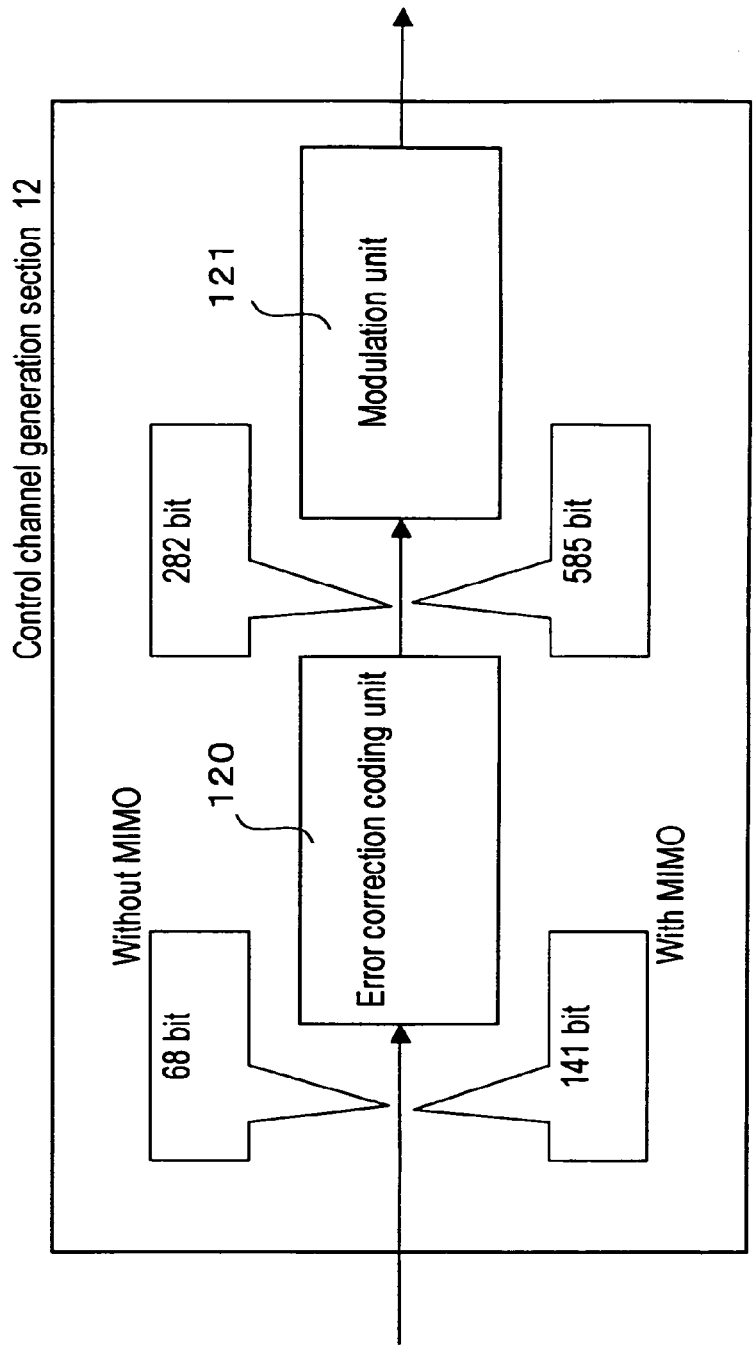
FIG. 8 shows a diagram illustrating a configuration of a control channel generation section 12, corresponding to the invention of the prior application.

In the above case, the configuration of control channel generation section 12 becomes as shown in FIG. 8.

There are provided an error correction coding unit 120 and a modulation unit 121. Error correction coding is performed in error correction coding unit 120, and corresponding thereto, error correction decoding is performed in control channel demodulation section 23 on the user terminal 2 side.

Now, let a coding rate R to be as R=0.241, where R is a ratio of the number of code information bits to be transmitted to the number of transmission code bits obtained by the error coding thereof. When MIMO is not applied in FIG. 8, the number of code information bits in a frame to be transmitted is 68, while the number of transmission code bits becomes 282=(68×1/0.241) bits.

Meanwhile, when MIMO is applied, if the number of code information bits in a frame to be transmitted is 141, the number of transmission code bits becomes 585=(141×1/0.241) bits.

Figure 6:
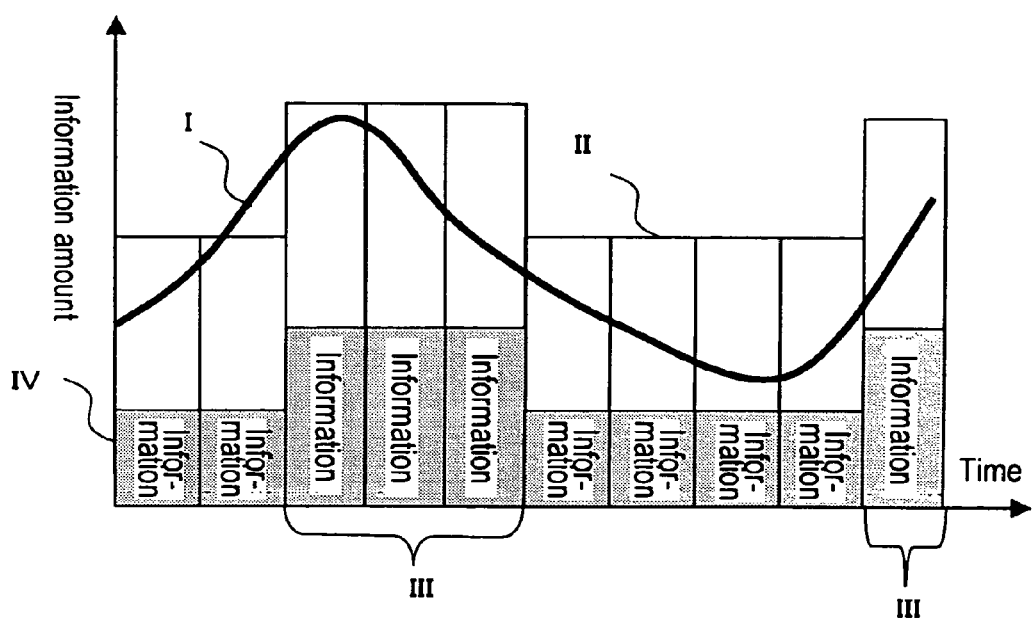
FIG. 6 shows a diagram illustrating relationship between a radio environment and an information amount in HS-SCCH when MIMO is applied.

As such, because of a fixed coding rate, there is a problem that the number of transmission code bits becomes large when MIMO is applied, as shown in FIG. 6.

Accordingly, the object of the present invention is to solve the above problem.

Figure 9:
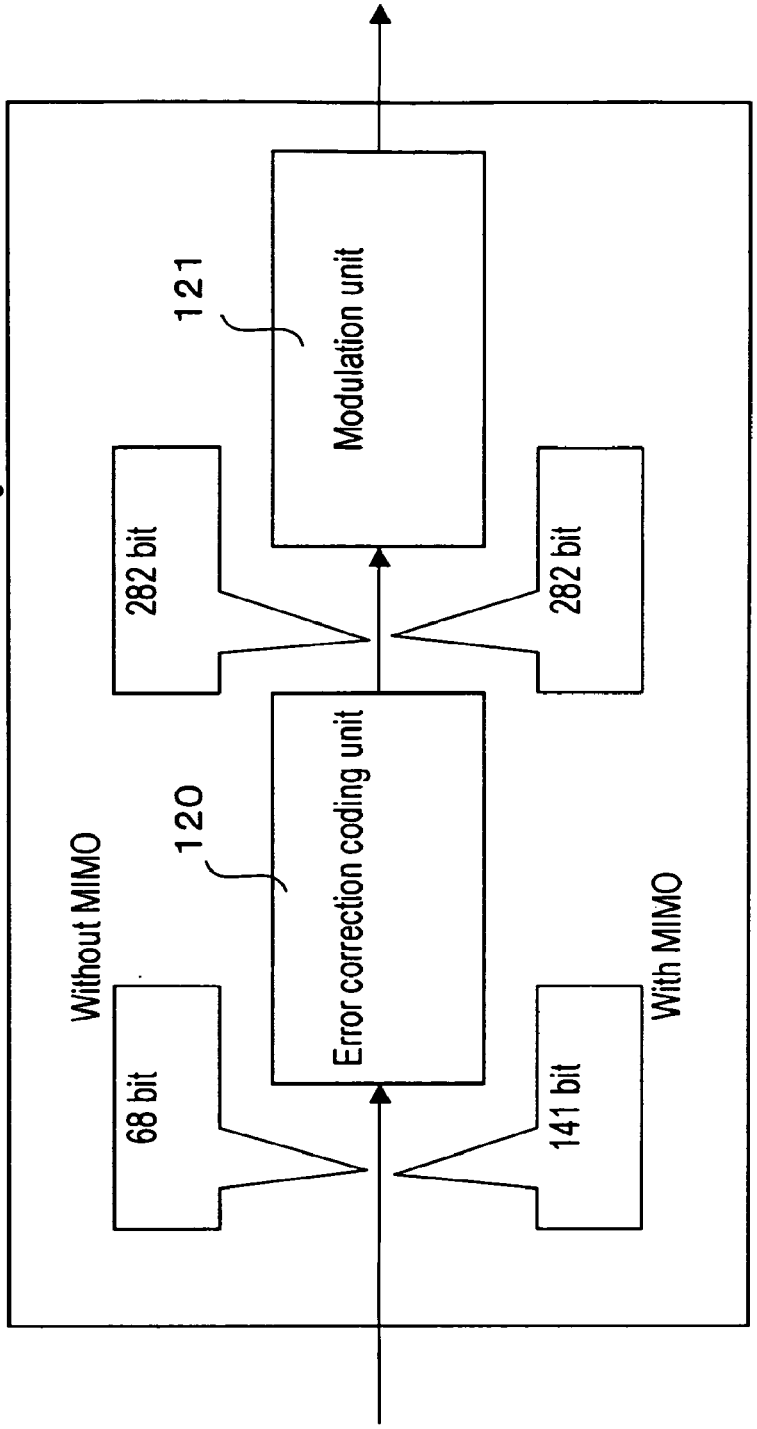
FIG. 9 shows a diagram illustrating a first exemplary configuration of control channel generation section 12, according to the present invention.

FIG. 9 shows a diagram illustrating a first exemplary configuration of control channel generation section 12, according to the present invention. Similar to the configuration shown in FIG. 8, control channel generation section 12 includes error correction coding unit 120 and modulation unit 121.

A feature different from the configuration shown in FIG. 8 is that the coding rate in error correction coding unit 120 is made variable.

A case of a large coding rate is weak against a propagation path error, while a case of a small coding rate is strong against a propagation path error. Meanwhile, MIMO is applied when there are few propagation errors, and MIMO is not applied when there are frequent propagation errors.

Therefore, according to the present invention, when MIMO is applied for user data, the coding rate of the error correction coding unit for generating the control channel is increased. To the contrary, when MIMO is not applied for user data, the coding rate of the error correction coding unit for generating the control channel is reduced.

As an embodiment, when MIMO is applied for user data, the coding rate of error correction coding unit 120 in control channel generation section 12 is set to be 0.5.

By this, the number of the transmission code bits becomes 282 (=141÷0.5), while when MIMO is not applied for user data, as in the exemplary case shown in FIG. 8, the coding rate in error correction coding unit 120 is set to be 0.24, and thus, 282 (=141÷0.5) bits are transmitted.

By this, irrespective of whether MIMO is applied or not, the number of transmission code bits becomes identical, and it becomes possible to obtain constant control information quality without wasting radio resources.

Figure 10:
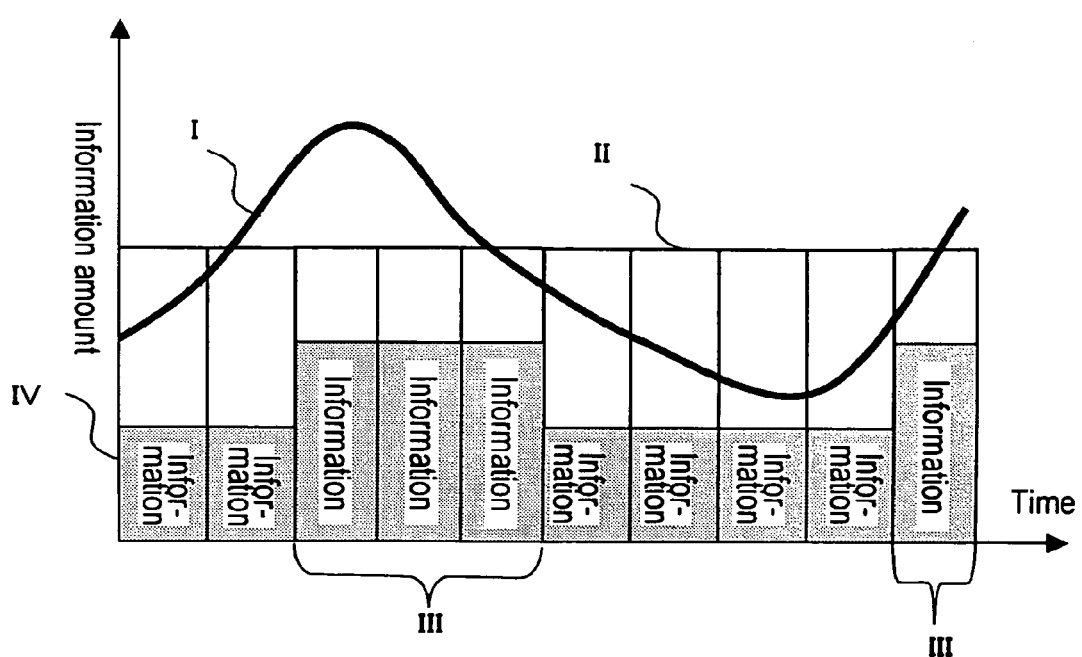
FIG. 10 shows a diagram illustrating relationship between application of MIMO and a control channel information amount, when the present invention is applied.

FIG. 10 shows a diagram illustrating relationship between application of MIMO and a control channel information amount when the present invention is applied. As compared with FIG. 6, even when MIMO is applied, it is possible to make constant the number of transmission code bits of error correction coding. Thus, it is possible to prevent resources from being wasted.

Figure 11:
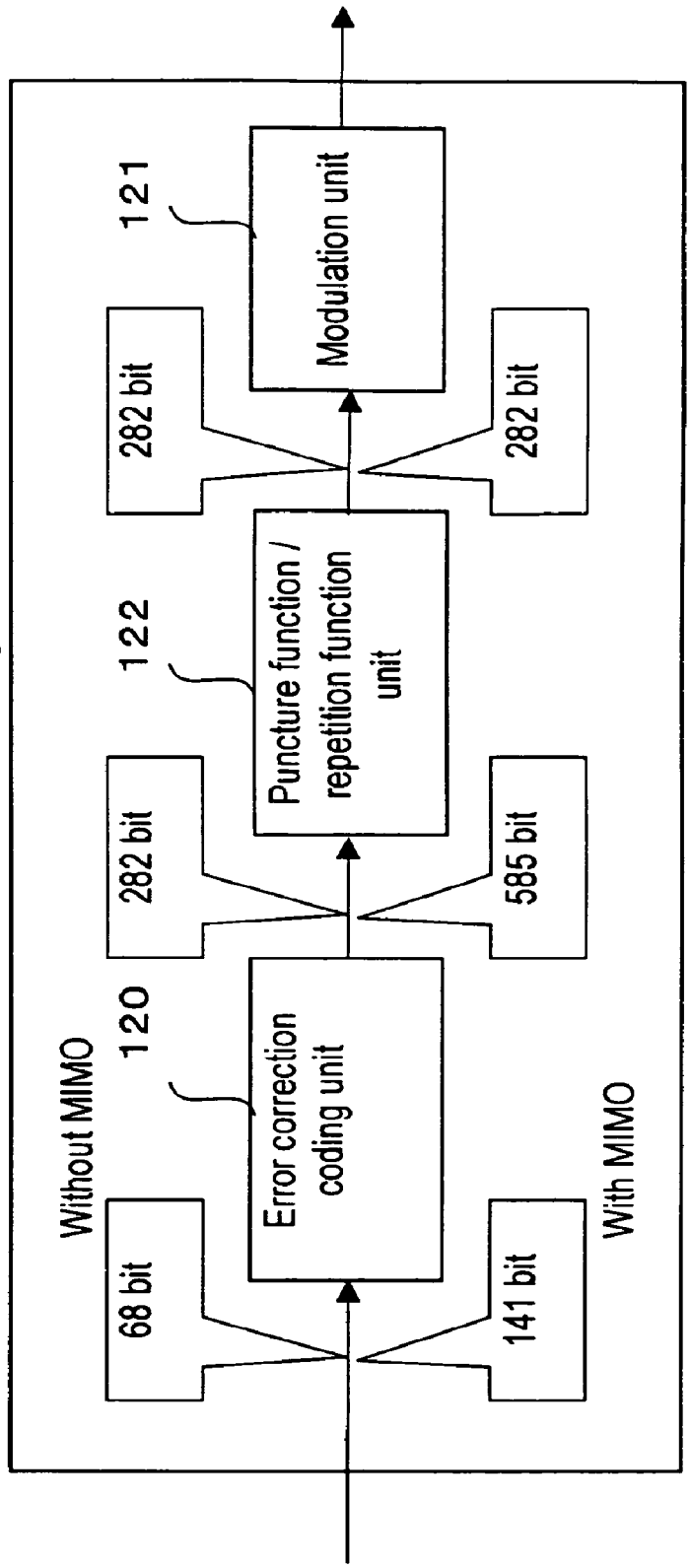
FIG. 11 shows a diagram illustrating another exemplary configuration of control channel generation section 12, according to the present invention.

FIG. 11 shows a diagram illustrating another exemplary configuration of control channel generation section 12, according to the present invention. In this embodiment, there is a feature that a unit 122 which selectively applies a puncture function or a repetition function is provided between error correction coding unit 120 and modulation unit 121.

Namely, according to the present embodiment, the coding rate of error correction coding unit 120 is made constant irrespective of whether MIMO is applied or not. Meanwhile, it is configured to vary the coding rate in an equivalent manner, by providing unit 122, having the puncture function or the repetition function, on the output side of error correction coding unit 120.

With this, the coding rate is made variable on the input side of modulation unit 121, which has the same signification as the configuration of control channel generation section 12 shown in FIG. 9.

Now, in case the puncture function is provided, by means of the puncture function, unit 122 performs decimation processing of the output data of error correction coding unit 120 at certain intervals, when MIMO is applied. When MIMO is not applied, the output data of error correction coding unit 120 is made to pass through without being changed. By this, irrespective of MIMO application, the bit counts when the output of error correction coding unit 120 is input to modulation unit 121 is made to be identical.

Also, when the repetition function is provided, by means of the repetition function, unit 122 repetitively outputs identical bits of the output data of error correction coding unit 120, when MIMO is not applied. In this case also, it is possible to make the number of transmission bits when MIMO is not applied substantially identical to the number of transmission bits when MIMO is applied.

Figure 12:
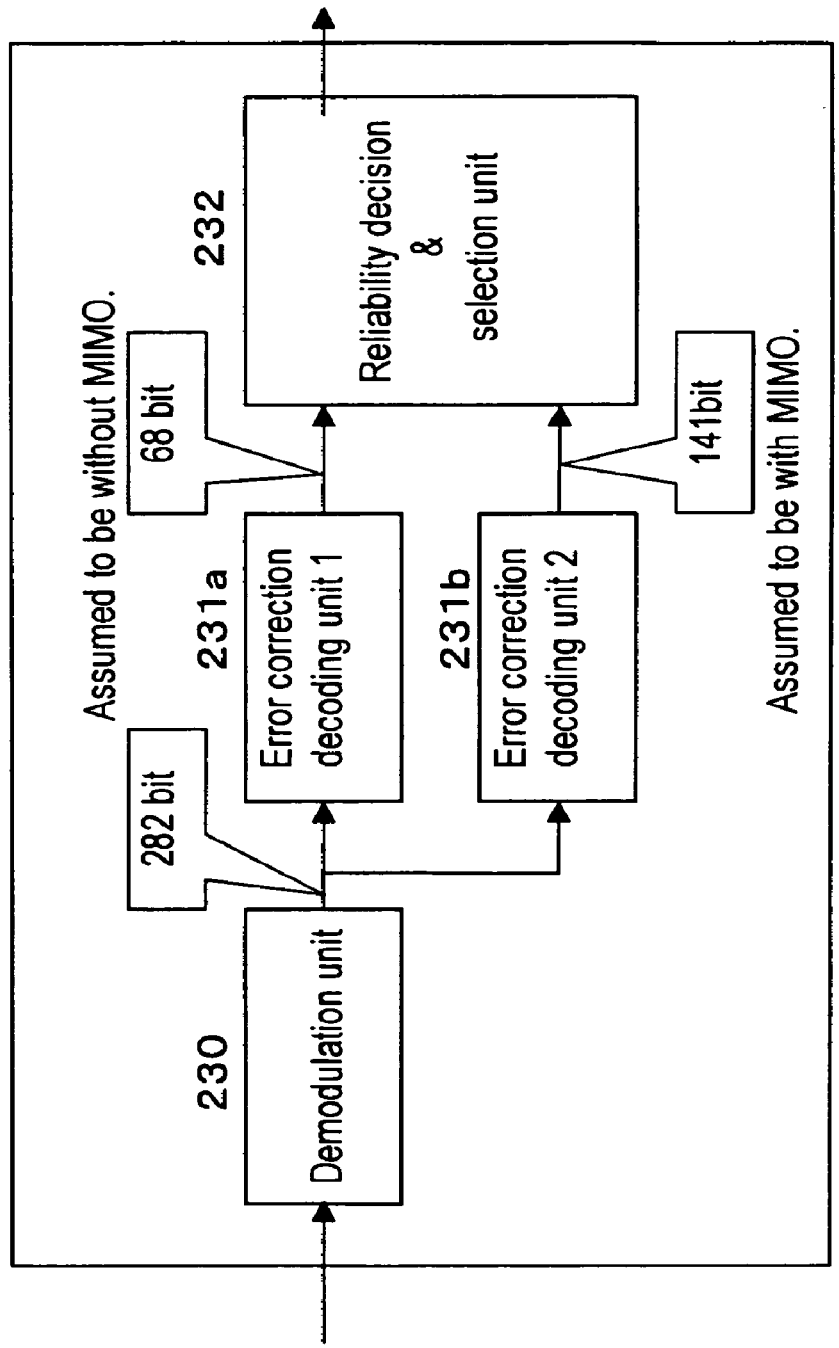
FIG. 12 shows an exemplary configuration of a control channel demodulation section in a user terminal, according to the present invention.

FIG. 12 shows yet another embodiment of the present invention. In the transmission system shown in FIG. 7, as a function of signaling generation section 11 in base station 1, the application or non-application of MIMO and a format in control channel generation section 12 are reported. The embodiment shown in FIG. 12 makes the above function of signaling generation section 11 unnecessary.

Namely, in user terminal 2, the receiving side, reception is made using two control channel format types corresponding to the cases when MIMO is applied and not applied. Then, from the received data, any one format which appears to be correct is detected. With this, base station 1, the transmitting side, can report to the receiving side the application or non-application of MIMO, without using an information bit resource for reporting the application or non-application of MIMO.

In control channel demodulation section 23 shown in FIG. 12, there are provided two error correction decoding units 231a, 231b, respectively corresponding to the above-mentioned two control channel format types, on the output side of a demodulator 230 for demodulating signals transmitted from the base station 1 side, without signaling demodulation.

The first error correction decoding unit 231a can obtain a correct output when performing error correction decoding to a frame signal having the number of bits of 68 when MIMO is not applied. For this purpose, error correction decoding unit 231a performs error correction decoding, based on an assumed coding rate=0.24.

Meanwhile, the second error correction decoding unit 231b can obtain a correct output when performing error correction decoding to a frame signal having the number of bits of 141 when MIMO is applied. For this purpose, error correction decoding is performed on the basis of an assumed coding rate=0.5.

From the outputs of the first and the second error correction decoding units 231a, 231b, a reliability decision & selection unit 232 decides which decoding result appears to be correct, and selects the output of either one side of error correction decoding units 231a, 231b, based on the above result.

By this, it is possible to save an information bit resource for reporting the application or non-application of MIMO.

FIG. 13 shows a diagram illustrating the effect of the present invention, as compared with the case of employing the invention of the prior application.

FIG. 13A shows transmission power ratio from the base station using HSDPA. The remaining power not shown in FIG. 13A corresponds to the power assigned to traffic channels.

FIG. 13B shows the power usable in the traffic channels obtained from FIG. 13A, on the basis of the number of channels in HS-SCCH. As described earlier, according to the invention in the prior application, the coding rate of HS-SCCH is constant even when the information amount becomes large. The power available for the traffic channels becomes different, depending on whether MIMO is applied or not (refer to III in FIG. 13B). In contrast, according to the present invention, the above power becomes constant (refer to IV in FIG. 13B).

For example, in case that the traffic channels are two channels (shown by the arrow in FIG. 13B), the effect of the present invention in terms of the power is 1.5 times as great as compared with the invention in the prior application.

INDUSTRIAL APPLICABILITY

As having been described according to the drawings, by making the coding rate of error correction coding variable according to the control channel mode in the present invention, it becomes possible to maintain the transmission quality constant, irrespective of a good or bad propagation condition, and also, even when MIMO is applied, it becomes possible to prevent excessive quality to the transmission of control information bits.

What is claimed is:

1. A radio communication system comprising:
   an encoder configured to perform error correction coding for control channel information by a given error correction coding rate;
   a modulator configured to perform modulation of the error correction coded control channel information for transmission according to a given modulation scheme;
   a processing section configured to perform code decimation of the error correction coded control channel information prior to the modulation, the code decimation being different according to whether the Multi Input Multi Output is applied or not;
   a plurality of decoders respectively configured to perform error correction decoding for a commonly received signal at coding rates, respectively corresponding to the processing of the code decimation according to whether the Multi Input Multi Output is applied or not; and
   a decision section configured to decide likelihood in a plurality of error correction decoded signals obtained by the plurality of decoders, and output an error correction decoded signal being decided to be valid based on the likelihood decision.

2. The radio communication system according to claim 1, wherein
   the processing enlarges an amount of the code decimation of the control channel information when the Multi Input Multi Output is applied, than the amount of the code decimation when the Multi Input Multi Output is not applied.

3. The radio communication system according to claim 1, further comprising:
   a transmitter configured to transmit the modulated control channel information.

4. The radio communication system according to claim 1, wherein
   an amount of the control channel information is different according to whether the Multi Input Multi Output is applied or not, and
   the encoder performs error correction coding for the control channel information by a given error correction coding rate regardless of the application of Multi Input Multi Output.

5. The radio communication system according to claim 1, wherein
   the processing section performs the code decimation so that a number of transmission bits of the control channel information becomes a given value regardless of the application of Multi Input Multi Output.

6. The radio communication system according to claim 1, further comprising:
   a demodulator configured to demodulate the modulated control channel information according to the predetermined modulation scheme.

7. The radio communication system according to claim 1, further comprising:
   a decoder configured to perform error correction decoding at respective coding rates corresponding to the processing of the code decimation according to whether the Multi Input Multi Output is applied or not.

8. A radio communication system comprising:
   an encoder configured to perform error correction coding for control channel information by a given error correction coding rate;
   a modulator configured to perform modulation of the error correction coded control channel information for transmission according to a given modulation scheme;
   a processing section configured to perform code decimation of the error correction coded control channel information prior to the modulation, the code decimation being different according to whether the Multi Input Multi Output is applied or not; and
   a receiver configured to receive the modulated control channel information transmitted from a transmission side, wherein
   the processing section performs the code decimation so that a number of transmission bits of the control channel information when Multi Input Multi Output is applied becomes identical to a number of transmission bits of the control channel information when Multi Input Multi Output is not applied.

9. A radio communication system comprising:
   an encoder configured to perform error correction coding for control channel information by a given error correction coding rate;
   a modulator configured to perform modulation of the error correction coded control channel information for transmission according to a given modulation scheme;
   a processing section configured to perform code decimation of the error correction coded control channel information prior to the modulation, the code decimation being different according to whether the Multi Input Multi Output is applied or not; wherein
   the processing section performs the code decimation so that a number of transmission bits of the control channel information when Multi Input Multi Output is applied becomes identical to a number of transmission bits of the control channel information when Multi Input Multi Output is not applied.

* * * * *